United States Patent
Kim et al.

(10) Patent No.: US 6,784,266 B2
(45) Date of Patent: Aug. 31, 2004

(54) DUAL STIMULI-RESPONSIVE HYDROGELS AND THEIR SYNTHETIC METHODS

(75) Inventors: Jungahn Kim, Seoul (KR); Kwang Ung Kim, Seoul (KR); Sang Seob Kim, Seoul (KR); Keon Hyeong Kim, Seoul (KR); Dong-Youn Shin, Seoul (KR); Soon-Geun Hwang, Anyang-si (KR); Jang Seop Kim, Seoul (KR)

(73) Assignees: Korea Institute of Science and Technology, Seoul (KR); Youl Chon Chemical Co., Inc., Seoul (KR)

( * ) Notice: Subject to any disclaimer, the term of this patent is extended or adjusted under 35 U.S.C. 154(b) by 0 days.

(21) Appl. No.: 10/282,532

(22) Filed: Oct. 28, 2002

(65) Prior Publication Data

US 2004/0024096 A1 Feb. 5, 2004

(30) Foreign Application Priority Data

Jul. 31, 2002 (KR) ........................................ 2002-45224

(51) Int. Cl.⁷ ................................................ C08F 32/08
(52) U.S. Cl. .................... 526/259; 526/306; 526/307.2; 526/280; 526/304; 526/260; 526/261
(58) Field of Search ................................ 526/304, 306, 526/307.2, 280, 259, 260, 261

(56) References Cited

U.S. PATENT DOCUMENTS 6,103,865 A * 8/2000 Bae et al. .................... 528/373

FOREIGN PATENT DOCUMENTS

EP   1 190 726 A2   3/2002

* cited by examiner

Primary Examiner—William Cheung
(74) Attorney, Agent, or Firm—Jones Day

(57) ABSTRACT

The present invention relates to a process for preparing copolymer hydrogels with controlled molecular weights and having both thermo- and pH-responsive properties, wherein the process comprises the steps of (a) providing sulfonamide type styrenic or (meth)acrylamide-based monomers exhibiting different $pK_a$ values; (b) providing poly(N-isopropylacrylamide) or crosslinked poly(N-isopropylacrylamide-co-methylene bisacrylamide) hydrogels having thermo-responsive properties; and (c) providing several hydrogels exhibiting pH-sensitive properties and random or block copolymerizations of the sulfonamide type styrenic or (meth)acrylamide-based monomers prepared in step (a) with N-isopropylacrylamide and/or methylene bisacrylamide monomers used in step (b) in a polar or non-polar solvent; wherein said steps (b) and (c) are carried out by controlled/living radical polymerization using alkyl halides as the initiators and the transition metals with phosphine or amine ligands as the catalysts. The present invention also relates to the copolymer hydrogels made by the aforesaid process.

1 Claim, No Drawings

DUAL STIMULI-RESPONSIVE HYDROGELS AND THEIR SYNTHETIC METHODS

FIELD OF THE INVENTION

The present invention relates to polymeric materials which are dual stimuli-responsive (DSR) to changes in both the temperature and pH of a human body, and a process for preparing such materials.

BACKGROUND OF THE INVENTION

An important ingredient for a drug delivery system (DDS) includes special materials for encapsulating or charging the active drug. Stimuli-responsive materials that have been used as such special materials up to now are described in Y. H. Bae, *Controlled Drug Delivery: Challenges and Strategies*, K. Park, Ed., Am. Chem. Soc., Chap. 8, pages 147–162, Washington, D.C. (1997).

Among the stimuli-responsive materials, poly(N-isopropylacrylamide) has been well known as a special polymer matrix for drug delivery because this polymer can exhibit a thermo-responsive property depending on the change of human body temperature. It also exhibits a physical property specific for the lower critical solution temperature (LCST).

Polymeric electrolytes obtained by polymerizing vinylic monomers having carboxyl acid, sulfonic acid, an amine or an ammonium group have been used as pH-responsive hydrogels such as described in *Polyelectrolyte Gels; Properties, Preparation, and Applications,*" R. S. Harland and R. K. Prud'homme, Eds., ACS Symp. Series # 480, Am. Chem. Soc., Chap. 17, page 285, Washington, D.C. (1992).

Known "intelligent" polymeric materials having DSR property include a copolymer obtained by grafting a pH-responsive enzyme onto a thermo-responsive material. Problems associated with preparing existing DSR material include difficulty in control of the molecular weight of the hydrogel formed, wherein the molecular weight may determine drug delivery efficacy.

SUMMARY OF THE PRESENT INVENTION

Accordingly, it is an object of the present invention to provide random or block hydrogel copolymers having both thermo- and pH-responsive properties.

Another object of the present invention is to provide a method for controlling the molecular weight of the random or block hydrogel copolymers, which affects both the thermo- and pH-responsive properties.

Other objects of the present invention will become apparent to those skilled in the art after having the benefit of this disclosure.

The present invention provides novel materials exhibiting DSR (dual stimuli-responsive) property such as both thermo and pH-responsive properties, and also covers a process of preparing these substances by atom transfer radical polymerization, wherein said process comprises the steps of: synthesizing sulfonamide-type vinylic monomers having pH-responsive properties; and, copolymerizing N-isopropylacrylamide or methylene bisacrylamide monomer having thermo-responsive property, with sulfonamide-type monomers to produce random or block copolymers exhibiting both pH-responsive and thermo-responsive properties.

As used herein, the term atom transfer radical polymerization (ATRP) also refers to "control/living" radical polymerization which is well described in the literature (T. E. Patten and K. Matyjaszewski, *Adv. Mater.*, 10, 10:901, 1998).

DETAILED DESCRIPTION OF THE PRESENT INVENTION

The present invention provides a process for preparing hydrogels having both thermo- and pH-responsive properties with controlled molecular weights, which comprises the steps of:

(a) synthesizing sulfoneamide type of vinyl monomers having pH-responsive properties;

(b) preparing poly(N-isopropylacrylamide) or its copolymer with methylene bisacrylamide having thermo-responsive property; and (c) random or block copolymerizing said pH-responsive monomers with thermo-responsive monomers; wherein said steps (b) and (c) are carried out by controlled/living radical polymerization using phosphine-based or amine-based transition-metal catalysts and alkyl halogen initiators.

The pH-responsive sulfoneamide type of styrene derivatives according to the present invention are monomers represented by the following formula (1) or (2).

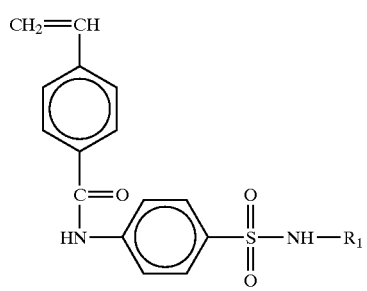

(1)

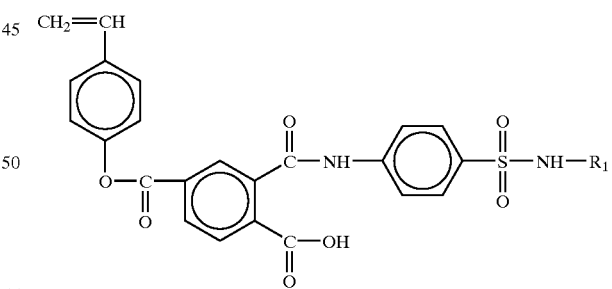

(2)

wherein,

R$_1$ is selected from the group consisting of phenyl, isoxazole, acetyl, methizole, dimethoxine, diazine, methoxypyridazine, methazine, isomidine and pyridine.

The compound of the following formula (3) is prepared by following the procedures described in S. Y. Park and Y. H. Bae, *Macromol. Rapid Commun.*, 20:269 (1999), and can be used as the (meth)acrylamide type monomer carrying a sulfonamide group of the present invention.

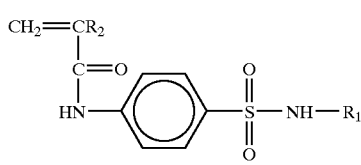

(3)

wherein $R_1$ is defined as above and $R_2$ is hydrogen or a methyl group.

The catalysts used in the present invention are the complexes of copper halide and the following ligands, bipyridine, iron halide and diimine, ruthenium halide and phosphines, nickel halide and phosphines, and the like. The preferred catalysts are the complexes of nickel halide and phosphines, iron halide and amine, and copper halide and amine.

The phosphines used in the present invention are bis(diphenylphosphino)ethane, bis(dimethylphosphino)ethane, bis(triphenyl) phosphine [(Ph$_3$P)$_2$], or bis(trimethyl) phosphine ([(CH$_3$)$_3$P]$_2$), and the like.

The amines used in the present invention include 2,2'-bipyridine, pentamethyl-diethylenetriamine, tris[2-(dimethylamino)ethyl]amine; (Me)$_6$ Tren, and the like.

Specifically, the phosphine-based nickel and iron catalysts include the compounds of the following formula (4) or (5)

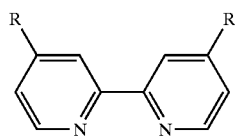

(4)

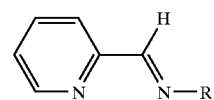

(5)

wherein $R_1$ to $R_5$ are independently selected from the group consisting of methyl, phenyl, iso-propyl, tert-butyl and ethyl;

Mt is nickel or iron; X is chlorine or bromine; and n is an integer of 1 to 3.

The amine-based copper catalysts used in the present invention have amine-based ligands represented by the following formulas (6) to (8):

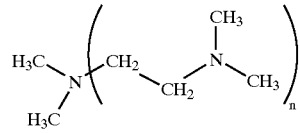

(6)

wherein R represents H, 5-nonyl or n-heptyl.

(7)

wherein R represents n-propyl or n-butyl.

(8)

wherein n represents 1, 2 or 3.

Generally, alkyl halides are used as the initiators in the present invention.

The solvents used in the present invention include polar solvents, such as dimethyl formamide, dimethyl sulfoxide, tetrahydrofuran, distilled water, solvents containing halogens, lower alcohols, or the mixtures thereof; and non-polar solvents, such as hexane, toluene, benzene or cyclohexane.

According to the present invention, the block copolymers can be prepared in the suitable temperature range of −78° C. to 150° C., more suitably between −50° C. to 30° C.

The DSR hydrogels prepared according to the present invention are represented by the following formulas (9) to (14):

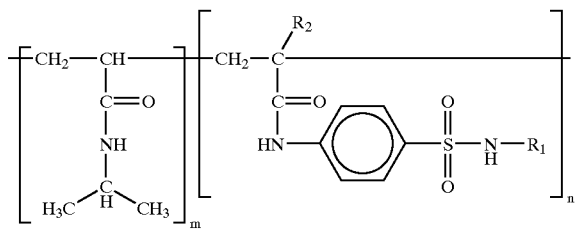

(9)

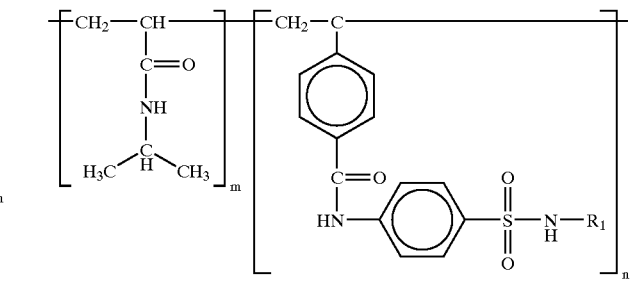

(10)

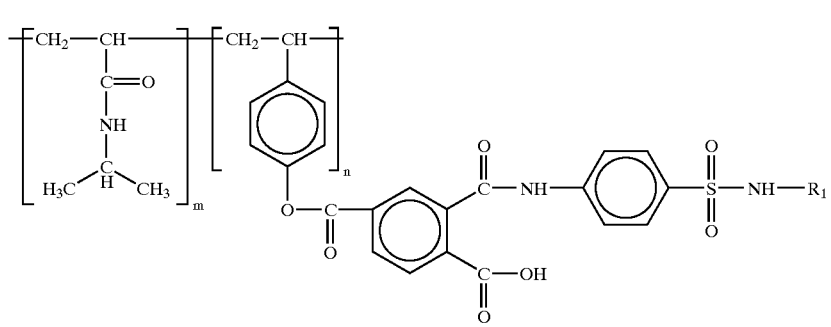

(11)

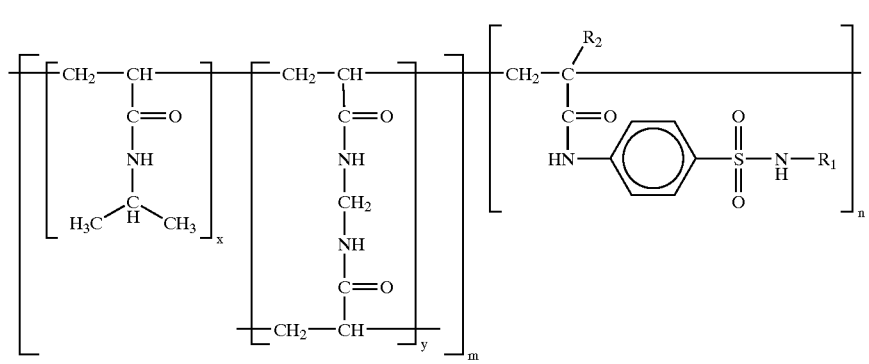

(12)

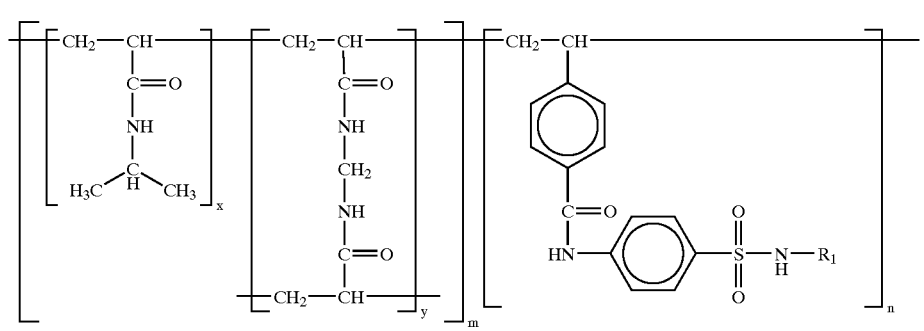

(13)

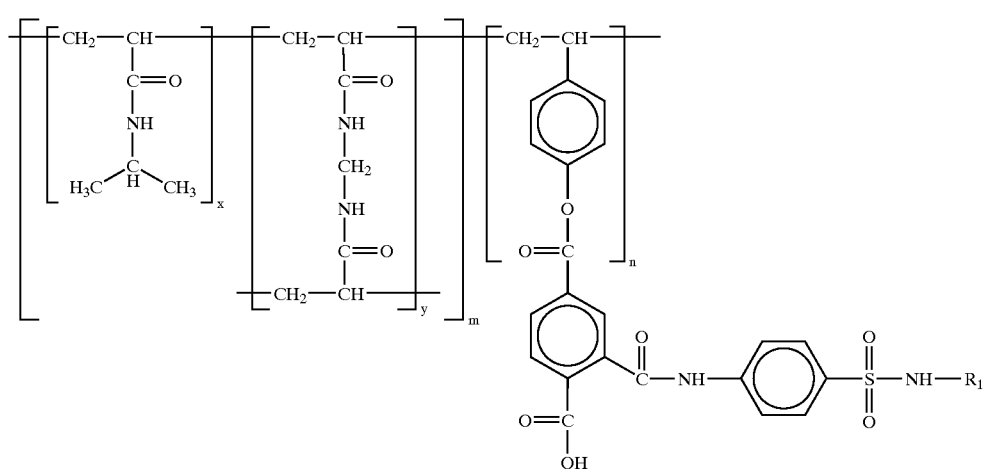

(14)

wherein $R_1$ is selected from the group consisting of phenyl, isoxazole, acetyl, methizole, dimethoxine, diazine, methoxypyridazine, methazine, isomidine and pyridine;

$R_2$ represents hydrogen or methyl;

m is 5 to 500, preferably 50 to 300;

n is 3 to 500, preferably 5 to 100; and the ratio of y/x ranges from 2/98 to 8/92.

The present invention is further illustrated by the following examples, but such examples are not intended to limit the invention in any way.

EXAMPLES

Example 1

The styrene-based monomer of 4-vinylbenzoyl-4-amino-N-(4,6-dimethyl-2-pyrimidyl) benzenesulfonamide exhibiting a pH-responsive property was synthesized by reacting sulfamethazine having the $pK_a$ value of 7.4 with 4-vinylbenzoic acid.

5 g of 4-vinylbenzoic acid and 0.34 mole of triethylamine were delivered into a 500 mL, 3 neck round bottom flask equipped with a reflux system under inert nitrogen gas, followed by adding 150 mL of tetrahydrofuran. Subsequently, 0.34 mole of ethylchloroformate was injected thereto at −20° C. and the reactor was stirred for 1 h.

To the resulting solution in the reactor, 0.34 mole of sulfamethazine dissolved in 200 mL of tetrahydrofuran, was delivered by using a syringe, followed by reacting for another 1 h. After the reaction was completed, the resulting product was washed with aqueous HCl (1 N) and aqueous $Na_2CO_3$ solution, at least three times. The resulting white solid was purified by re-crystallization in a mixture of acetone-hexane (1/1, v/v). The yield of the purified monomer was 55% on the basis of the incipient amount of reagents used.

Example 2

The styrene-based monomer of 4-vinylbenzoyl-3-(p-aminobenzensulfamido)-6-methoxypyridazine was synthesized by reacting 0.34 mole of sulfamethoxypyridazine having the $pK_a$ value of 6.7 under the same conditions described in Example 1, followed by purification of the resulting product. The yield of the resulting monomer was 42%.

Example 3

The styrene-based monomer of 4-vinylbenzoyl-2,4-dimethoxy-6-sulfanylamido-1,3-diazine was synthesized by reacting 0.34 mole of sulfamethoxine with 4-vinylbenzoic acid under the same conditions as Example 1. The yield of the resulting monomer was 62%.

Example 4

5 g (0.0125 mol) of diphenylphosphinoethane and 1.7 g (6.25×10⁻³ mole) of nickel(II) bromide hydrate ($NiBr_2.3H_2O$) were dissolved in 50 mL of ethanol, respectively. The two solutions were then mixed in a 250 mL round bottom flask, followed by reacting at room temperature for 3 h with stirring. Subsequently, ethanol was removed, followed by adding 160 mL of a mixture of acetone/benzene (3/5, v/v). The resulting solution was stirred to obtain a dark blue crystal, followed by adding 2.14 g of nickel (II) bromide hydrate dissolved in 100 mL of ethanol. The reactants were refluxed at 80° C. for 1 h resulting in production of a dark red precipitate. This precipitate was dissolved into 500 mL of ethanol, and the un-dissolved portion was removed by filtration. The remaining solution was dried in a vacuum oven and 5 g of a complex of diphenylphosphinoethane and nickel (II) bromide was obtained. This complex was dissolved in 100 mL of toluene, to be used as the catalyst of the present invention.

Example 5

The catalyst (5×10⁻⁵ mol) prepared in Example 4 was reacted with methyl 2-bromo-propionate (1×10⁻⁴ mol) at 25° C. under inert nitrogen gas with stirring for 5 min to obtain the initiator for ATRP.

Subsequently, 2.26 g (0.02 mole) of N-isopropylacrylamide (NiPAM) was delivered into a 250 mL 3-neck flask using a syringe under the inert nitrogen gas, followed by adding 5 mL of dimethylformamide anhydrate.

The air in the reactor was then removed by purging with nitrogen gas at 90° C. for 30 min, followed by delivering the initiator solution into the reactor using a syringe and polymerizing the solution with stirring for 3 h. This solution was precipitated in hot water. After filtration, it was dried. Finally, 2.1 g of poly(N-isopropylacrylamide) with average molecular weight 25,000 g/mol and 1.34 polydispersity, was obtained. The molecular weight was determined by both ¹H NMR and size exclusion chromatographic analysis at room temperature.

Example 6

4 g of the sulfonamide type of styrene derivative prepared in Example 1 was polymerized by following the same procedures as in Example 5. 2.8 g of hydrogel with molecular weight 12,000 g/mol was obtained by following the steps described in Example 5.

Example 7

After 20 mL of poly(N-isopropylacrylamide) (PNiPAM) solution prepared in Example 5 was taken using a syringe, 2 g of the sulfonamide-based styrene derivative in Example 1 was dissolved in 100 mL of dimethylsulfoxide and added into the reactor. The reaction temperature increased to 120° C. and the polymerization was performed with stirring for 6 h. After completion of the reaction, a part of solvent was removed by distillation, then 50 mL of the solution was precipitated in 500 mL of diethyl ether and filtered. 1.5 g of block hydrogel of poly(N-isopropylacrylamide -b-styrenic sulfonamide) with molecular weight 32,000 g/mol was obtained, in which there were 220 repeating units of NiPAM and there were 17 repeating units of styrenic sulfonamide on the basis of ¹H NMR analysis.

Example 8

Under the same reaction conditions as described in Example 7, 2 g of the sulfonamide-based styrene derivative prepared in Example 2 was polymerized. 1.6 g of block hydrogel of poly(N-isopropylacrylamide-b-styrenic sulfonamide) with average molecular weight 29,000 g/mol was obtained, in which there were 220 repeating units of NiPAM and there were 10 repeating units of styrenic sulfonamide on the basis of ¹H NMR analysis.

Example 9

Under the same reaction conditions as shown in Example 7, 2 g of the sulfonamide-based styrene derivative prepared in Example 3 was polymerized. 1.4 g of the block hydrogel of poly(NiPAM-b-styrenic sulfonamide) with average molecular weight 36,000 g/mol was prepared, in which there were 220 repeating units of NiPAM and there were 25 repeating units of styrenic sulfonamide on the basis of ¹H NMR analysis.

Example 10

According to the method described in the literature (S. Y. Park and Y. H. Bae, *Macromol. Rapid Commun.*, 1999, 20, 269.), the reaction of 3 mL of methacryloyl chloride and 10 g of sulfamethoxypyridazine exhibiting a $pK_a$ value of 6.7 produced 8 g of sulfamethoxypyridazinyl methacrylamide as a methacrylamide type monomer carrying a sulfonamide group. This was purified prior to use. Under the same reaction conditions as in Example 5, 3 g of N-isopropylacrylamide was polymerized in dimethylformamide (50 mL) at 25° C. for 24 h. The molecular weight of the resulting poly(N-isopropylacrylamide) was 28,000 g/mol. 3 g of the sulfonamide-based methacrylamide dissolved in 50 mL of dimethylformamide (DMF) was delivered into the reactor using a syringe, followed by co-polymerization at 90° C. for 6 h. The resulting polymer was purified by following the same procedures as described in Example 7. 5.1 g of block hydrogel of poly(N-isopropylacrylamide-b-sulfamethoxypyridazinyl methacrylamide) with average molecular weight 40,000 g/mol was obtained, in which there were 248 repeating units of NiPAM and there were 34 repeating units of sulfamethoxypyridazinyl methacrylamide on the basis of $^1$H NMR analysis.

Example 11

2 g of 4-hydroxystyrene was dissolved in 100 mL of tetrahydrofuran (THF), and 3.2 g of trimellitic anhydride chloride and 2.6 mL of triethylamine (96%) were delivered into the reactor, followed by reaction at 30° C. with stirring for 6 h. The resulting product was dissolved into an excess of methanol, followed by re-crystallization. 4.1 g of the resulting styrene derivative carrying the anhydride group, 4-[(1,3-dioxo-5-phthalanecarbonyl)oxy]styrene was obtained. This styrene derivative was charged into a 250 mL 3-neck flask, followed by adding 100 mL of DMF and 4.5 g of sulfamethazine with $pK_a$ of 7.4. The reaction was then carried out at 50° C. with stirring for 6 h. 6.5 g of the corresponding styrene derivative having both carboxyl and sulfamethazine groups, 4-[(1-sulfamethazinylamido-2-carboxyl-5-phthalane-carbonyl) oxy]styrene, was obtained by re-crystallization using ethanol.

Example 12

3.0 g of the same styrene derivative having the anhydride group as prepared in Example 11 and 4.2 g of sulfadimethoxine (FW: 310.3) with $pK_a$ 6.1 were reacted in the same manner as described in Example 11. 6.5 g of the corresponding styrene derivative having carboxyl and sulfadimethoxyine groups, 4-[(1-sulfamethoxinylamido-2-carboxyl-5-phthalanecarbonyl) oxy]styrene, was obtained.

Example 13

Under the same conditions as in Example 12, the reaction with 3.5 g of sulfadiazine (FW: 250.3) having $pK_a$ of 6.52 produced 5.5 g of the corresponding styrene derivative, 4-[(1-sulfadiazinylamido-2-carboxyl-5-phthalanecarbonyl) oxy]styrene.

Example 14

Under the same conditions as in Example 12, the reaction of the styrene derivative with 4.0 g of sulfapyridine (FW: 249.3) with $pK_a$ of 8.43 produced 5.7 g of the corresponding styrene derivative, 4-[(1-sulfapyridinylamido-2-carboxyl-5-phthalanecarbonyl)oxy]styrene.

Example 15

Under the same conditions as in Example 12, 4.0 g of sulfabenzamide (FW: 276.3) exhibiting $pK_a$ of 4.57 was reacted with the styrene derivative resulting in the production of 6.0 g of the corresponding styrene derivative, 4-[(1-sulfabenzamido-2-carboxyl-5-phthalanecarbonyl) oxy]styrene.

Example 16

3 g of N-isopropylacrylamide was charged in a 250 mL 3-neck flask under inert nitrogen gas, followed by adding 100 mL of distilled water using a syringe. CuBr/Me$_6$TREN (tris[2-(dimethylamino)ethyl]amine) ($5.0 \times 10^{-5}$ mole) was used as the catalyst and methyl-2-bromopropionate ($1.0 \times 10^{-4}$ mole) was used as an initiator, which were injected into the reactor. Polymerization was performed at room temperature for 24 h, followed by termination and purification. 2.9 g of poly(N-isopropylacrylamide) hydrogel with average molecular weight 22,000 g/mol was obtained.

Example 17

3 g of pure sulfamethoxypyridazinyl methacrylamide prepared in Example 10 was polymerized by following the same procedures as described in Example 16, followed by termination and purification. 2.5 g of the corresponding hydrogel with average molecular weight 25,000 g/mol was synthesized.

Example 18

Under the same conditions as in Example 16, 2.5 g of poly(N-isopropylacrylamide) (MW:20,000) was first prepared by ATRP, followed by adding 1.5 g of sulfadimethoxinyl methacrylamide into the reactor and copolymerizing at room temperature with stirring for 24 h. 3.8 g of poly(N-isopropylacrylamide)-b-sulfadimethoxinyl methacrylamide) copolymer was obtained, in which there were 177 repeating units of NiPAM and there were 32 repeating units of—sulfadimethoxinyl methacrylamide on the basis of $^1$H NMR analysis. In addition, poly(sulfadimethoxinyl methacrylamide) was first synthesized by using 1.5 g of the corresponding monomer via ATRP using 4-bromomethyl sodium benzoate instead of methyl-2-bromopropionate as the initiator, followed by adding NiPAM monomer and polymerizing it. Consequently, the corresponding hydrogel having the same composition was also synthesized.

Example 19

Under the same conditions as in Example 16, 3.5 g of N-isopropylacrylamide and methylene bisacrylamide (98/2, mol/mol) were copolymerized for 16 h. 2.4 g of the cross-linked hydrogel with 2 mol % of the degree of cross-linking was prepared. 1.5 g of sulfadimethoxine methacrylamide monomers was again delivered into the reactor and polymerized at room temperature with stirring for 24 h. 4.8 g of poly[(N-isopropylacrylamide-co-methylene bisacrylamide)-b-sulfadimethoxyl methacrylamide] core-shell type block copolymer was synthesized.

Example 20

1.5 g of 4-[(1-sulfamethazinylamido-2-carboxyl-5-phthalanecarbonyl)oxy]styrene prepared in Example 11 was polymerized under the same conditions as described in Example 16. 0.8 g of the corresponding hydrogel having average molecular weight 7,000 g/mol was obtained.

Example 21

1.5 g of 4-[(1-sulfamethazinylamido-2-carboxyl-5-phthalanecarbonyl)oxy]styrene prepared in Example 11 was polymerized under the same conditions as in Example 18. 3.9 g of the corresponding block copolymer was synthesized.

Example 22

1.5 g of the styrene derivative, 4-[(1-sulfamethazinylamido-2-carboxyl-5-phthalane-carbonyl)

oxy]styrene, prepared in Example 11 was polymerized under the same conditions as in Example 19. Correspondingly, 5.8 g of crosslinked block hydrogel, poly[(N-isopropylacrylamide-co-methylene bisacrylamide)-b-4-[(1-sulfamethazinylamido-2-carboxyl-5-phthalane-carbonyl) oxy]styrene] was obtained.

Example 23

2.0 g of pure sulfamethoxypyridazinyl methacrylamide prepared in Example 10 and 2.0 g of N-isopropylacrylamide were charged into a 250 mL 3-neck flask under inert nitrogen gas, followed addition of 100 mL of distilled water using a syringe. CuBr/Me$_6$TREN (5.0×10$^{-5}$ mole) as the catalyst prepared above and methyl-2-bromopropionate (1.0×10$^{-4}$ mole) as the initiator, were then injected and polymerized at room temperature with stirring for 24 h. 3.9 g of poly(N-isopropylacrylamide-co-sulfamethoxypyridazinyl methacrylamide) random hydrogel copolymer with average molecular weight 39,000 g/mol was obtained. The conversion was over 98% on the basis of $^1$H NMR analysis.

Example 24

2.0 g of sulfamethoxypyridazinyl methacrylamide prepared in Example 10 and 2.0 g of N-isopropylacrylamide/ 0.02 g of methylene bisacrylamide were charged into a 250 mL 3-neck flask under nitrogen gas, followed by delivery of 100 mL distilled water using a syringe. CuBr/Me$_6$TREN complex (5.0×10$^{-5}$ mole) as the catalyst and methyl-2-bromopropionate (1.0×10$^{-4}$ mole) as the initiator were injected and reacted at room temperature with stirring for 24 h. 3.9 g of the corresponding cross-linked random hydrogel copolymer was synthesized. The conversion was over 97% on the basis of $^1$H NMR analysis. The determination of molecular weight for the cross-linked material was impossible, and $^1$H NMR analysis was obtained by dissolving the material into a solvent after drying and obtaining powder by grinding.

Example 25

1.5 g of 4-[(1-sulfamethazinylamido-2-carboxyl-5-phthalanecarbonyl)oxy]styrene prepared in Example 11 was polymerized under the same conditions as in Example 23. 3.1 g of poly(N-isopropylacrylamide-co-4-[(1-sulfamethazinylamido-2-carboxyl-5-phthalanecarbonyl) oxy]styrene) random hydrogel copolymer with average molecular weight 29,000 g/mol was synthesized, in which the conversion was 88 mol % based on the incipient amount of monomers used.

Example 26

2.0 g of 4-[(1-sulfamethazinylamido-2-carboxyl-5-phthalanecarbonyl)oxy]styrene prepared in Example 11 was synthesized under the same conditions as Example 24. 3.9 g of the corresponding cross-linked random hydrogel copolymer was obtained.

As the present disclosure shows, the molecular weights of hydrogels having both thermo- and pH-responsive properties at the same time can be controlled with the present invention. Thus, the present invention allows change of the physical properties of the hydrogels and the polymerization yield according to the process of the present invention is higher than what is conventionally available. The catalysts remained after polymerization was conveniently removed because a polar or non-polar solvent was selectively used.

While the present invention has been described in detail and with reference to specific embodiments, it will become apparent to one skilled in the art that various changes and modifications can be made without departing from the spirit and scope thereof.

What is claimed is:

1. Block copolymer hydrogels represented by any one of the following formulas (9) to (14):

(9)

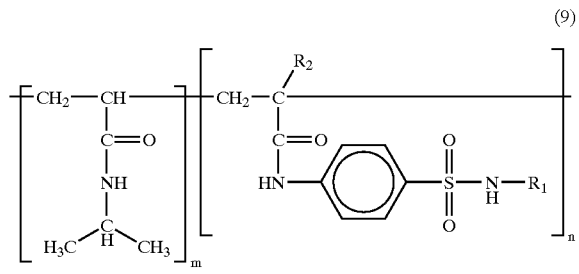

(10)

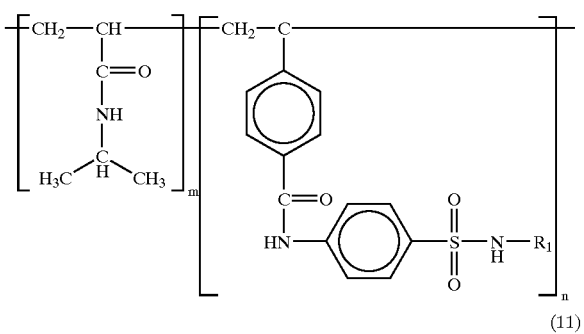

(11)

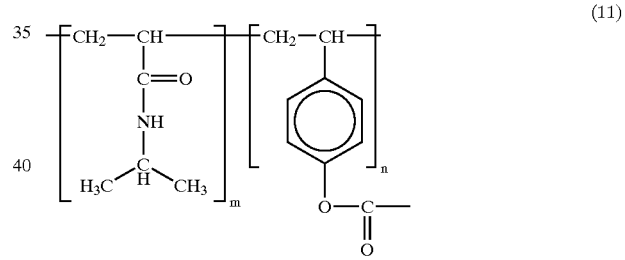

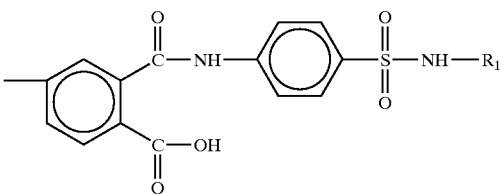

(12)

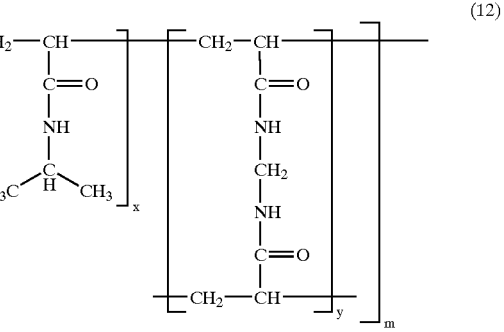

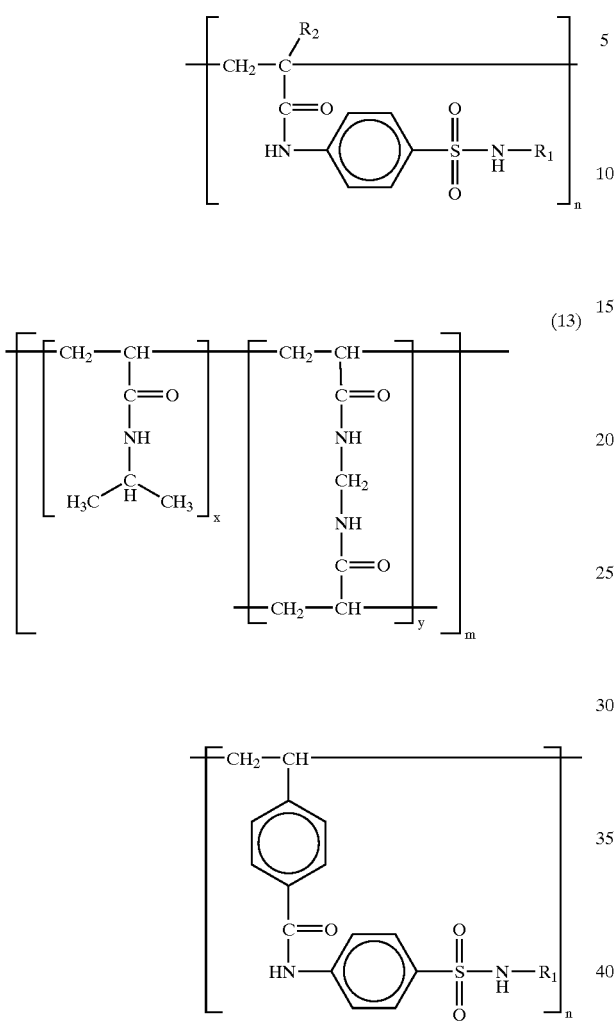
(13)
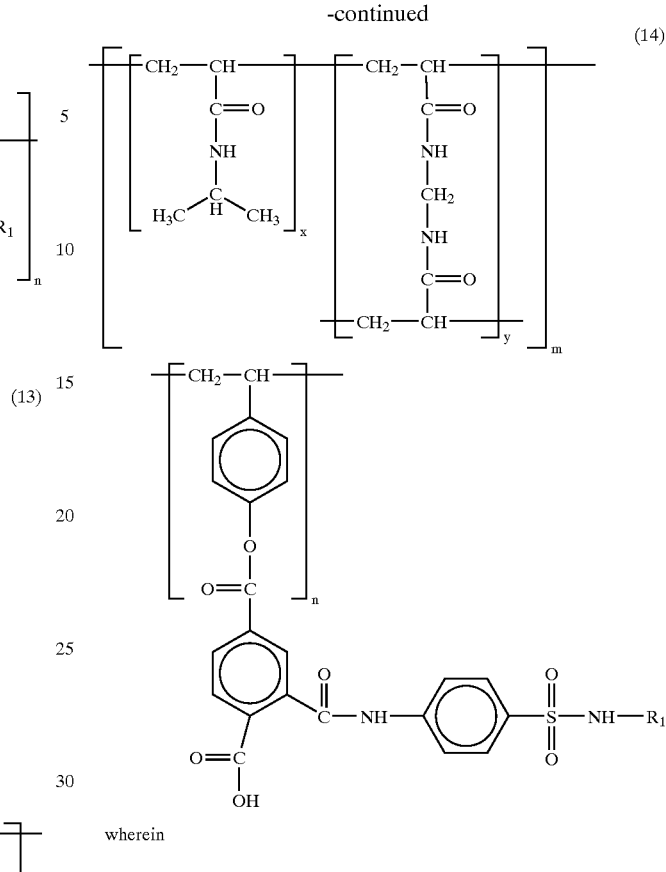
(14)
wherein
$R_1$ is selected from the group consisting of phenyl, isoxazole, acetyl, methizole, dimethoxine, diazine, methoxypyridazine, methazine, isomidine and pyridine;
$R_2$ represents hydrogen or methyl;
m is 5 to 500;
n is 3 to 500; and
the ratio of y/x ranges from 2/98 to 8/92.
* * * * *